US012630007B2

(12) United States Patent
Ryuno

(10) Patent No.: US 12,630,007 B2
(45) Date of Patent: May 19, 2026

(54) VEHICLE FRONT STRUCTURE

(71) Applicants: TOYOTA JIDOSHA KABUSHIKI KAISHA, Toyota (JP); SUBARU CORPORATION, Tokyo (JP)

(72) Inventor: Yoshiyuki Ryuno, Nagoya (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 405 days.

(21) Appl. No.: 18/242,574

(22) Filed: Sep. 6, 2023

(65) Prior Publication Data

US 2024/0123820 A1 Apr. 18, 2024

(30) Foreign Application Priority Data

Oct. 6, 2022 (JP) ................................. 2022-161971

(51) Int. Cl.
*B60K 15/05* (2006.01)
*B62D 25/04* (2006.01)

(52) U.S. Cl.
CPC .............. *B60K 15/05* (2013.01); *B62D 25/04* (2013.01); *B60K 2015/0553* (2013.01)

(58) Field of Classification Search
CPC . B60K 15/05; B60K 2015/0553; B62D 25/04
See application file for complete search history.

(56) References Cited

U.S. PATENT DOCUMENTS

| | | | | |
|---|---|---|---|---|
| 514,142 | A | * 2/1894 | Worden | ................. B61D 15/06 |
| | | | | 105/425 |
| 8,075,329 | B1 | * 12/2011 | Janarthanam | ...... H01R 13/6272 |
| | | | | 439/304 |
| 9,079,504 | B2 | * 7/2015 | Amano | ................... B60L 53/16 |
| 9,187,133 | B2 | * 11/2015 | Rangaswamaiah | .... B62D 21/15 |
| 9,371,093 | B1 | * 6/2016 | Holmstrom | ............ B62D 25/04 |
| 9,656,694 | B2 | * 5/2017 | Terashima | ........... B62D 21/152 |
| 9,827,971 | B2 | * 11/2017 | Suzuki | .................. B60L 53/126 |
| 2010/0038156 | A1 | * 2/2010 | Fujitake | .................. B60L 50/16 |
| | | | | 180/65.21 |
| 2010/0116571 | A1 | 5/2010 | Suzuki | |
| 2020/0307702 | A1 | 10/2020 | Kataoka et al. | |
| 2024/0351459 | A1 | * 10/2024 | Lucy | ...................... B60L 53/16 |

FOREIGN PATENT DOCUMENTS

| | | |
|---|---|---|
| JP | 2019-084891 A | 6/2019 |
| JP | 2020-157950 A | 10/2020 |
| WO | 2009/028520 A1 | 3/2009 |

* cited by examiner

*Primary Examiner* — Jonathan Malikasim
(74) *Attorney, Agent, or Firm* — Dinsmore & Shohl LLP

(57) ABSTRACT

A vehicle front structure includes a front pillar, a charging inlet, and a guide member. The front pillar extends in the vehicle up-down direction in a vehicle front. The charging inlet is disposed in front of the front pillar in the vehicle front-rear direction. An outlet cable is connectable to the charging inlet from the lateral side of a vehicle. The guide member is mounted to the front pillar and disposed between the front pillar and the charging inlet. The guide member includes an inclined surface that is inclined outward in the vehicle width direction from the vehicle front side toward the vehicle rear side, in a plan view.

4 Claims, 4 Drawing Sheets

VEHICLE FRONT STRUCTURE

CROSS-REFERENCE TO RELATED APPLICATION

This application claims priority to Japanese Patent Application No. 2022-161971 filed on Oct. 6, 2022, incorporated herein by reference in its entirety.

BACKGROUND

1. Technical Field

The disclosure relates to a vehicle front structure.

2. Description of Related Art

Japanese Unexamined Patent Application Publication No. 2019-84891 (JP 2019-84891 A) discloses a charging lid device that includes a storage body, a lid portion, and a connection-unit movable mechanism. The storage body stores, inside a vehicle body, a charging inlet to which a charging gun is to be connected. The lid portion is openable and closeable to cover a charging port of the storage body that is open to the outside of the vehicle body. The connection-unit movable mechanism is configured to operate in conjunction with the open-close operation of the lid portion. When the lid portion is opened, the connection-unit movable mechanism causes a connection unit of the charging inlet connected to the charging gun to appear on the outside of the vehicle body.

SUMMARY

Although, in the configuration disclosed in JP 2019-84891 A, the charging inlet to which the charging gun (outlet cable) is to be connected is provided in a side surface of a vehicle rear, the charging inlet is provided in a side surface of a vehicle front when a charging is performed at the vehicle front. In this configuration, when the charging inlet moves rearward upon a frontal collision of a vehicle, the charging inlet may be caught between a barrier and a frame member of the vehicle such as a front pillar to cause an incomplete crush.

The disclosure has been made in light of the above-described circumstances, and is directed to obtaining a vehicle front structure that can secure crashworthiness upon a vehicle frontal collision, in a structure including a charging inlet in a vehicle front.

A first aspect of the disclosure relates to a vehicle front structure including a front pillar, a charging inlet, and a guide member. The front pillar extends in the vehicle up-down direction in a vehicle front. The charging inlet is disposed in front of the front pillar in the vehicle front-rear direction. An outlet cable is connectable to the charging inlet from the lateral side of a vehicle. The guide member is mounted to the front pillar and disposed between the front pillar and the charging inlet. The guide member includes an inclined surface that is inclined outward in the vehicle width direction from the vehicle front side toward the vehicle rear side, in a plan view.

In the vehicle front structure according to the first aspect, the front pillar extends in the vehicle up-down direction in the vehicle front, and the charging inlet is disposed in front of the front pillar in the vehicle front-rear direction. Since the charging inlet is configured such that the outlet cable is connectable to the charging inlet from the lateral side of the vehicle, when the outlet cable is connected to the charging inlet, electric power is supplied to the vehicle. That is, a battery mounted on the vehicle is charged.

The guide member is mounted to the front pillar and disposed between the front pillar and the charging inlet. In addition, the guide member includes the inclined surface that is inclined outward in the vehicle width direction from the vehicle front side toward the vehicle rear side, in the plan view. This configuration allows the charging inlet to move outward in the vehicle width direction along the inclined surface of the guide member when the charging inlet is moved rearward upon a frontal collision of the vehicle, thereby suppressing contact of the charging inlet with the front pillar.

In the vehicle front structure according to the first aspect, the front pillar may include a pillar outer panel having a hat shape in cross-section with the inner side of the pillar outer panel open in the vehicle width direction, and one end of the guide member may be joined to an edge line of the pillar outer panel.

In the vehicle front structure having the above-described configuration, since the one end of the guide member is joined to the edge line of the pillar outer panel, a load applied to the guide member from the charging inlet that is moved rearward upon the frontal collision of the vehicle is dispersed on the upper side and the lower side of the front pillar along the edge line. It is noted that the concept ⏀being joined to the edge line⏀ described herein is not limited to the configuration in which the entire part of the one end of the guide member is joined to the edge line, but may include a configuration in which at least part of the one end of the guide member is joined to the edge line or joined to the vicinity of the edge line.

In the vehicle front structure according to the first aspect, the charging inlet may include a main body having a cylindrical shape, and the main body may have a chamfered portion on at least part of the peripheral surface of the main body. The part of the peripheral surface faces the guide member. The chamfered portion may be inclined in the same direction as the inclined surface of the guide member is.

In the vehicle front structure having the above-described configuration, the charging inlet has the chamfered portion, and the chamfered portion is inclined in the same direction as the inclined surface of the guide member is. This configuration allows the chamfered portion to slide along the inclined surface when the charging inlet is moved rearward upon the frontal collision of the vehicle, thereby allowing the charging inlet to be moved outward in the vehicle width direction, effectively.

In the vehicle front structure according to the first aspect, the charging inlet may include a main body having a cylindrical shape, the main body may have a chamfered portion on at least part of the peripheral surface of the main body, the part of the peripheral surface facing the guide member, the chamfered portion may be inclined in the same direction as the inclined surface of the guide member is, and an inclination angle of the chamfered portion may be the same as an inclination angle of the inclined surface.

In the vehicle front structure having the above-described configuration, the inclination angle of the chamfered portion is the same as that of the inclined surface. This configuration allows the charging inlet to be moved outward in the vehicle width direction more stably than the configuration in which the inclination angle of the chamfered portion is different from that of the inclined surface.

In the vehicle front structure according to the first aspect, the front pillar may include a pillar outer panel having a hat shape in cross-section with the inner side of the pillar outer panel open in the vehicle width direction, one end of the guide member may be joined to an edge line of the pillar outer panel, and part of the guide member may be disposed to overlap the charging inlet as viewed in the vehicle width direction.

In the vehicle front structure having the above-described configuration, the part of the guide member overlaps the charging inlet as viewed in the vehicle width direction, thereby eliminating or minimizing g a gap between the charging inlet and the guide member. This configuration allows the charging inlet to be brought into contact with the guide member early upon the frontal collision of the vehicle, thereby suppressing deformation of the guide member caused by the charging inlet.

As described above, with the vehicle front structure according to the disclosure, crashworthiness upon a vehicle frontal collision can be secured in the structure including the charging inlet in the vehicle front.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a cross-sectional plan view illustrating a vehicle front structure according to a first modification example, corresponding to the view in FIG. 1; and FIG. 4 is a cross-sectional plan view illustrating a vehicle front structure according to a second modification example, corresponding to the view in FIG. 1.

DETAILED DESCRIPTION OF EMBODIMENTS

Figure 1:
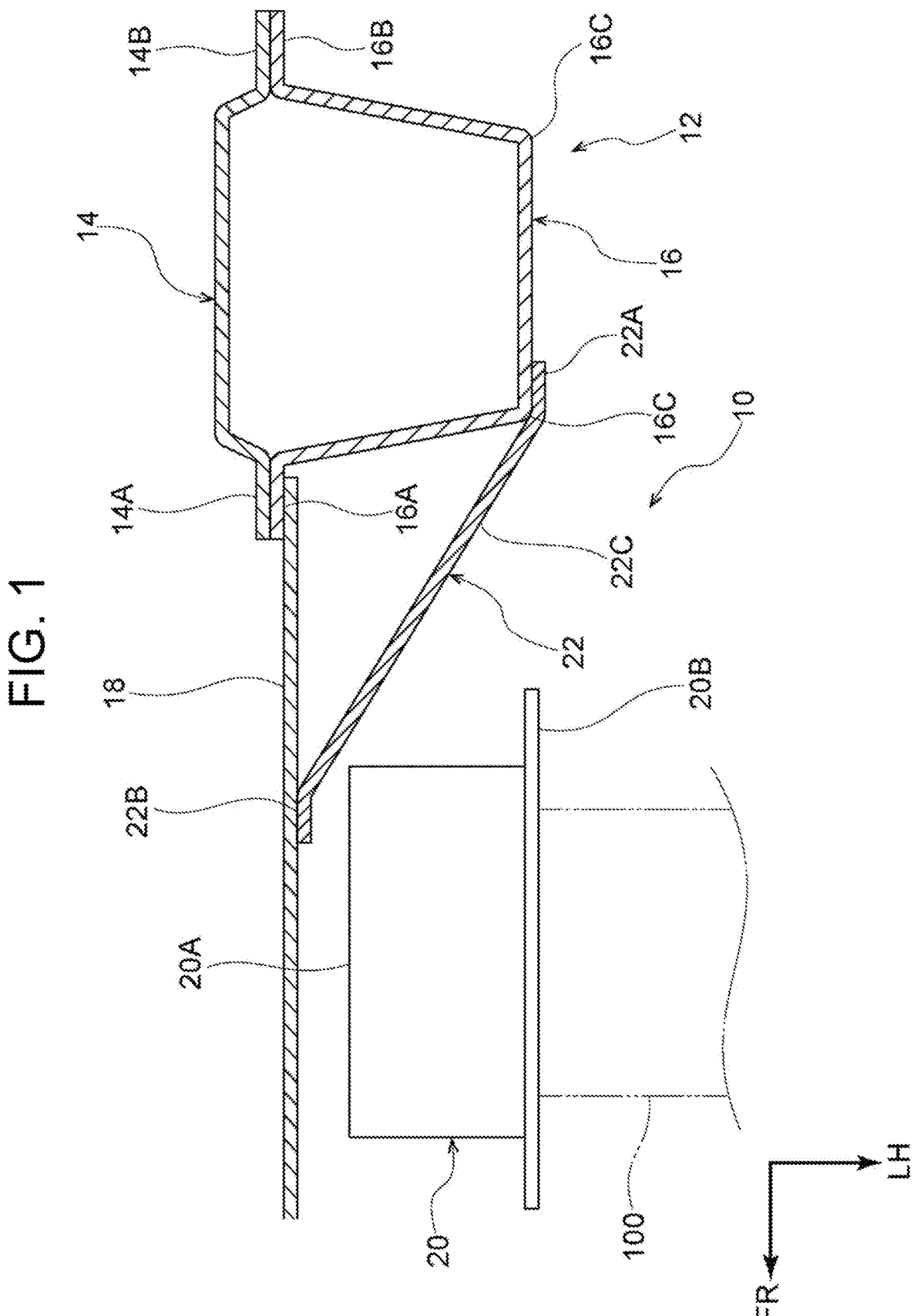
FIG. 1 is an expanded cross-sectional plan view illustrating a plan cross-section of a vehicle front structure according to an embodiment.

The following will describe a vehicle front structure 10 according to an embodiment with reference to the accompanying drawings. It is noted that an arrow FR and an arrow LH shown in the drawings indicate the respective sides of a vehicle to which the vehicle front structure 10 is mounted. Specifically, the arrow FR and the arrow LH indicates the front side of the vehicle in the vehicle front-rear direction and the left side of the vehicle placed in the traveling direction, respectively. In the following description, unless otherwise specified, 〔front〔 and 〔rear〔 refer to the front side and the rear side, respectively, in the vehicle front-rear direction, ‖upper‖ and ｜lower｜ refer to the upper side and the lower side, respectively, in the vehicle up-down direction, and ｜right‖ and ｜left‖ refer to the right side and the left side, respectively, in the vehicle width direction.

As illustrated in FIG. 1, the vehicle front structure 10 of the embodiment includes a front pillar 12, a charging inlet 20, and a guide member 22. In the embodiment, the charging inlet 20 is disposed in a side portion of the vehicle on the vehicle left side, as an example, but the configuration is not limited to this. The charging inlet 20 may be disposed on the vehicle right side.

Alternatively, in a vehicle provided with a charging port for normal charging on the vehicle left side and a charging port for quick charging on the vehicle right side, for example, the charging inlet 20 may be disposed on each of the right and left sides of the vehicle.

Front Pillar 12

A pair of front pillars 12 is disposed in the vehicle front. One of the front pillars 12 is disposed on the vehicle right side and the other of the front pillars 12 is disposed on the vehicle left side. The front pillars 12 are frame members extending in the vehicle up-down direction. An upper portion of each of the front pillars 12 is connected to a front end of a roof side rail. The roof side rail is a frame member disposed in an upper part of the vehicle and extending along a front side-window glass. A lower portion of each of the front pillars 12 is connected to a front end of a rocker panel. The rocker panel is a frame member extending along an opening portion of a side door. It is noted that FIG. 1 illustrates the front pillar 12 on the vehicle left side. The following describes the front pillar 12 on the vehicle left side.

The front pillar 12 includes a pillar inner panel 14, a pillar outer panel 16, and a pillar lower panel 18. The pillar inner panel 14 has a substantially hat shape in cross-section, with the outer side of the pillar inner panel 14 open in the vehicle width direction. An inner front flange 14A is a front end portion of the pillar inner panel 14, and extends toward the vehicle front side. An inner rear flange 14B is a rear end portion of the pillar inner panel 14, and extends toward the vehicle rear side.

The pillar outer panel 16 has a substantially hat shape in cross-section, with the inner side of the pillar outer panel 16 open in the vehicle width direction. An outer front flange 16A is a front end portion of the pillar outer panel 16, and extends toward the vehicle front side. An outer rear flange 16B is a rear end portion of the pillar outer panel 16, and extends toward the vehicle rear side.

The inner front flange 14A of the pillar inner panel 14 and the outer front flange 16A of the pillar outer panel 16 are overlapped with and joined to each other by welding or the like. The inner rear flange 14B of the pillar inner panel 14 and the outer rear flange 16B of the pillar outer panel 16 are overlapped with and joined to each other by welding or the like. As a result, the pillar inner panel 14 and the pillar outer panel 16 of the front pillar 12 form a closed shape in cross-section.

The outer front flange 16A of the pillar outer panel 16 and the pillar lower panel 18 are overlapped with and joined to each other. The pillar lower panel 18 has a substantially plate shape, and extends in the vehicle up-down direction and the vehicle front-rear direction. The front pillar 12 is provided with the guide member 22. The guide member 22 will be described later.

Charging Inlet 20

The charging inlet 20 is disposed in front of the front pillar 12 in the vehicle front-rear direction, and includes a main body 20A and a mounting seat 20B. The main body 20A has a substantially cylindrical shape and is open to the outside of the vehicle in the vehicle width direction. The main body 20A is configured such that an outlet cable (charging gun) 100 is connectable to the main body 20A from the outside of the main body 20A in the vehicle width direction.

The charging inlet 20, for example, is disposed inside a charging port provided in a steel plate of the vehicle and covered by an open-close cover (not illustrated) from the outside in the vehicle width direction. The charging inlet 20 is electrically connected to a battery (not illustrated) disposed under a vehicle floor, and electric power is supplied to the battery through the outlet cable 100 to allow the battery to be charged.

The mounting seat 20B of the charging inlet 20 extends outwardly from the outer periphery of the main body 20A and is mounted to an upper member via a bracket. The upper member is a frame member extending in the vehicle front-rear direction.

Guide Member

The guide member 22 provided on the front pillar 12 is formed into a substantially plate shape by sheet metal forming or the like. Alternatively, the guide member 22 may be formed from ingot made of aluminum or the like.

The guide member 22 is disposed in a space between the front pillar 12 and the charging inlet 20. The guide member 22 has an inclined surface 22C that is inclined outward in the vehicle width direction from the vehicle front side toward the vehicle rear side, in a plan view. Specifically, one end 22A of the guide member 22 is bent along the pillar outer panel 16, and overlapped with and joined to an edge line 16C on the front side of the pillar outer panel 16. Another end 22B of the guide member 22 is bent along the pillar lower panel 18, and overlapped with and joined to the pillar lower panel 18. Part of the guide member 22 that includes the other end 22B is disposed to overlap the charging inlet 20 as viewed in the vehicle width direction.

A portion of the guide member 22 between the one end 22A and the other end 22B is the inclined surface 22C that is inclined outward in the vehicle width direction from the vehicle front side toward the vehicle rear side, in the plan view. The guide member 22 and the front pillar 12 thus form a closed shape in cross-section.

The inclined surface 22C is disposed so as to face the main body 20A of the charging inlet 20 in the vehicle front-rear direction. An inclination angle of the inclined surface 22C to the pillar lower panel 18, i.e., an angle between the inclined surface 22C and the pillar lower panel 18, is set at 45 degrees or less.

Operation

The following will describe operations of the embodiment.

In the vehicle front structure 10 of the embodiment, the front pillar 12 extends in the vehicle up-down direction in the vehicle front, and the charging inlet 20 is disposed in front of the front pillar 12 in the vehicle front-rear direction. Since the charging inlet 20 is configured such that the outlet cable 100 is connectable to the charging inlet 20 from the lateral side of the vehicle, when the outlet cable 100 is connected to the charging inlet 20, electric power is supplied to the vehicle. That is, the battery mounted on the vehicle is charged.

The guide member 22 is mounted to the front pillar 12, and the guide member 22 is disposed between the front pillar 12 and the charging inlet 20. In addition, the guide member 22 has the inclined surface 22C that is inclined outward in the vehicle width direction from the vehicle front side toward the vehicle rear side, in the plan view.

Figure 2:
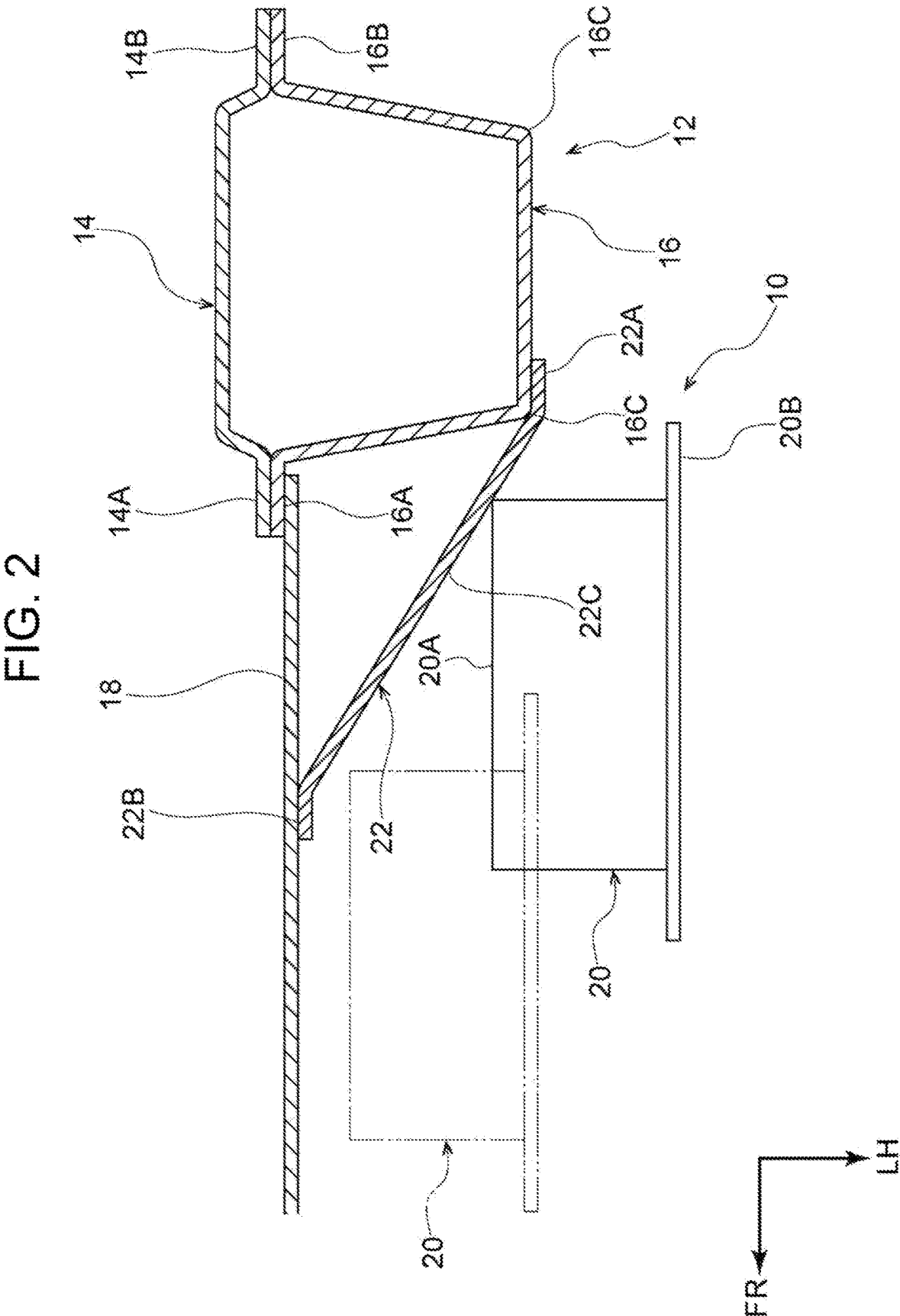
FIG. 2 is a cross-sectional plan view illustrating a state in which a charging inlet is moved rearward from the state illustrated in FIG. 1.

This configuration allows the charging inlet 20 to move outward in the vehicle width direction along the inclined surface 22C of the guide member 22 when the charging inlet 20 is moved rearward upon a frontal collision of the vehicle, as illustrated in FIG. 2. In FIG. 2, a position of the charging inlet 20 before the frontal collision of the vehicle is indicated with chain double-dashed lines, and a state where the charging inlet 20 is being moved rearward upon the frontal collision of the vehicle is indicated with solid lines.

When the charging inlet 20 is moved further rearward along the inclined surface 22C from the state of FIG. 2, the charging inlet 20 falls off the vehicle to suppress contact of the charging inlet 20 with the front pillar 12. As a result, in the structure that includes the charging inlet 20 in the vehicle front, crashworthiness upon the frontal collision of the vehicle is secured.

In the embodiment, since the one end 22A of the guide member 22 is joined to the edge line 16C of the pillar outer panel 16, a load applied to the guide member 22 from the charging inlet 20 that is moved rearward upon the frontal collision of the vehicle is dispersed on the upper side and the lower side of the front pillar 12 along the edge line 16C.

In addition, in the embodiment, since the other end 22B of the guide member 22 overlaps the main body 20A of the charging inlet 20 as viewed in the vehicle width direction, a gap between the charging inlet 20 and the guide member 22 is eliminated or minimized. This configuration allows the charging inlet 20 to be brought into contact with the guide member 22 early upon the frontal collision of the vehicle, thereby suppressing deformation of the guide member 22 caused by the contact with the charging inlet 20 that is moved rearward.

Figure 3:
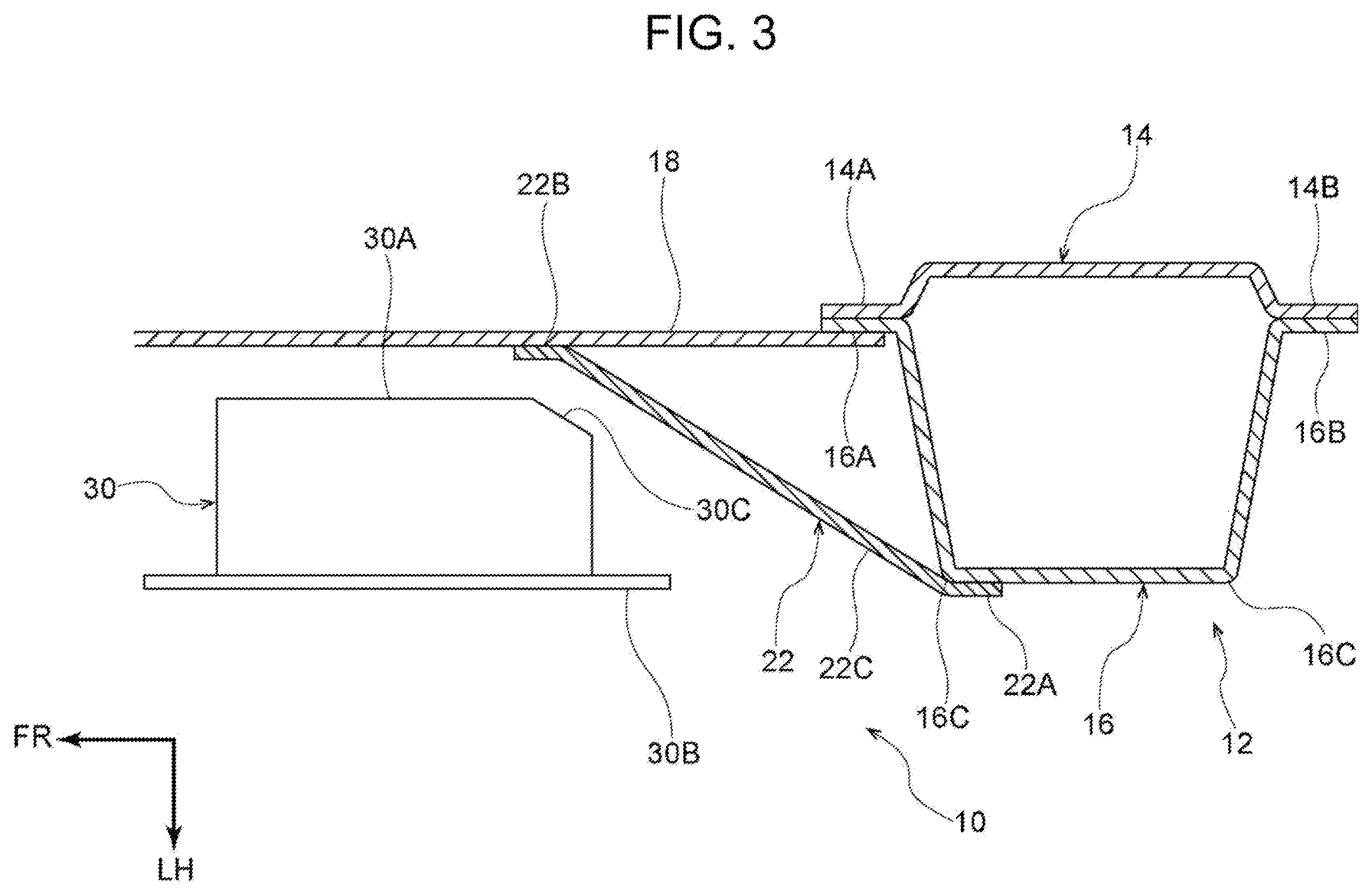
Figure 4:
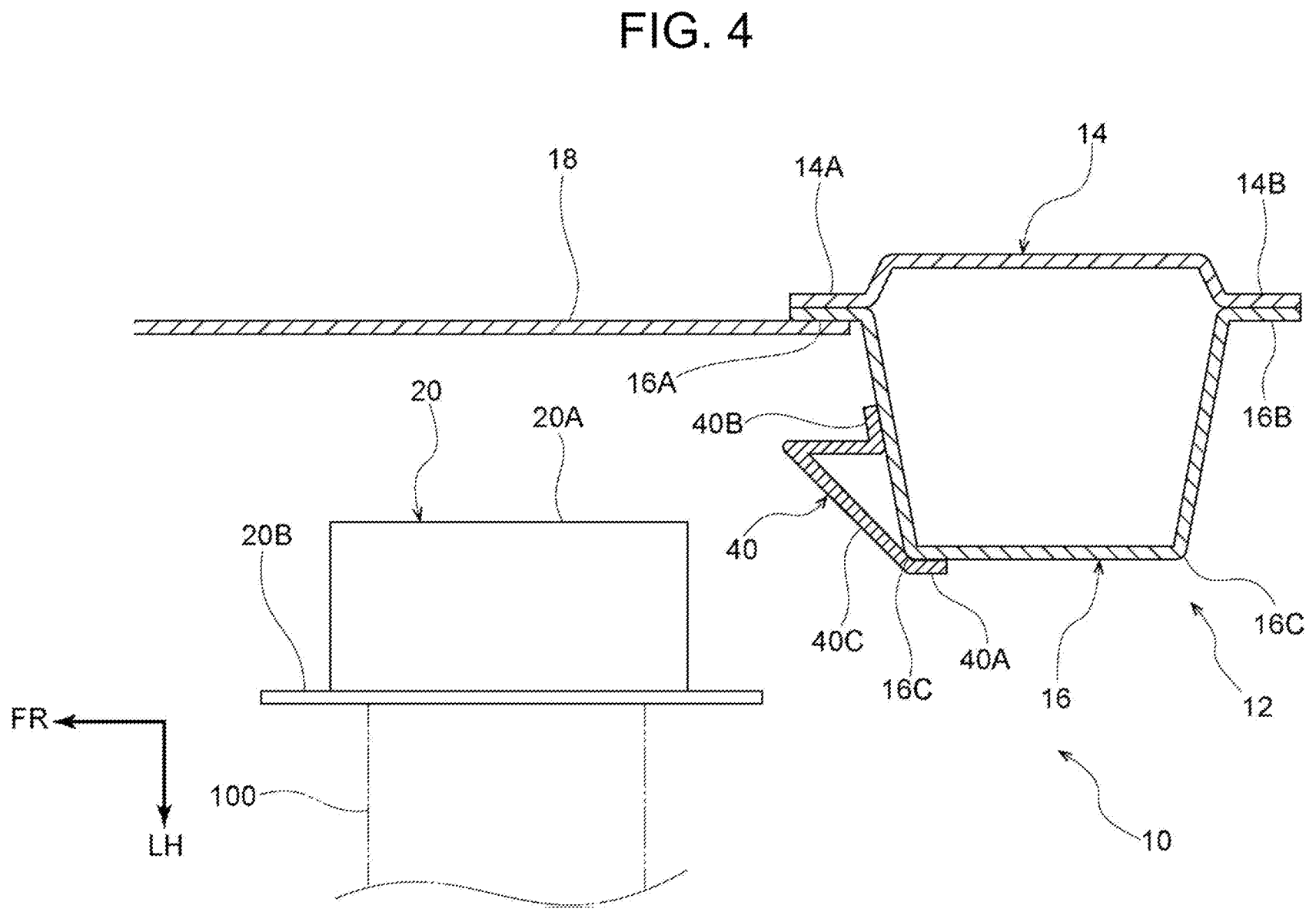

It is noted that, in the embodiment, the main body 20A of the charging inlet 20 has an angle at an end on the inner side of the main body 20A in the vehicle width direction, but the configuration is not limited to this. For example, the configuration of a first modification example as illustrated in FIG. 3 may be adopted. In the embodiment, the other end 22B of the guide member 22 is joined to the pillar lower panel 18, but the configuration is not limited to this. For example, the configuration of a second modification example as illustrated in FIG. 4 may be adopted.

First Modification Example

FIG. 3 is a cross-sectional plan view illustrating the vehicle front structure 10 according to the first modification example. As illustrated in FIG. 3, a charging inlet 30 in the first modification example is different in shape from the charging inlet 20 of the embodiment.

Specifically, the charging inlet 30 is disposed in front of the front pillar 12 in the vehicle front-rear direction, and includes a main body 30A and a mounting seat 30B. The main body 30A has a substantially cylindrical shape as a whole and is open to the outside of the vehicle in the vehicle width direction. The main body 30A is configured such that the outlet cable (charging gun) 100 is connectable to the main body 30A from the outside of the main body 30A in the vehicle width direction.

The main body 30A of the charging inlet 30 has a chamfered portion 30C on a peripheral surface of the main body 30A. The chamfered portion 30C is provided on at least part of the peripheral surface of the main body 30A. The part of the peripheral surface, on which the chamfered portion 30C is provided, faces the guide member 22.

It is noted that, in the first modification example, the chamfered portion 30C is provided on the part of the main body 30A, but the configuration is not limited to this. The chamfered portion 30C may be provided on the entire periphery of the main body 30A.

In the first modification example, the chamfered portion 30C is inclined in the same direction as the inclined surface 22C of the guide member 22 is, and an inclination angle of the chamfered portion 30C is the same as that of the inclined surface 22C of the guide member 22. Specifically, a bottom surface of the main body 30A of the charging inlet 30, which is on the inner side in the vehicle width direction, is disposed substantially in parallel with the pillar lower panel 18, and the inclination angle of the chamfered portion 30C to the bottom surface of the main body 30A is substantially the same as that of the inclined surface 22C to the pillar lower panel 18.

It is noted that the inclination angle of the chamfered portion 30C may be different from that of the inclined surface 22C of the guide member 22. The chamfered portion 30C of the first modification example has a shape of chamfering, but the configuration is not limited to this. The chamfered portion 30C may have a shape of round chamfering. When the chamfered portion 30C is provided by the round chamfering, the main body 30A does not have any angle. This configuration suppresses a local stress acting on part of the inclined surface 22C when the charging inlet 30 comes into contact with the guide member 22.

As in the first modification example, the charging inlet 30 has the chamfered portion 30C that is inclined in the same direction as the inclined surface 22C of the guide member 22. This configuration allows the chamfered portion 30C to slide along the inclined surface 22C when the charging inlet 30 is moved rearward upon the frontal collision of the vehicle, thereby allowing the charging inlet 30 to be moved outward in the vehicle width direction, effectively.

In the first modification example, in particular, the inclination angle of the chamfered portion 30C is the same as that of the inclined surface 22C. This configuration allows the charging inlet 30 to be moved outward in the vehicle width direction more stably than the configuration in which the inclination angle of the chamfered portion 30C is different from that of the inclined surface 22C.

Second Modification Example

FIG. 4 is a cross-sectional plan view illustrating the vehicle front structure 10 according to the second modification example. As illustrated in FIG. 4, a guide member 40 in the second modification example is different from the guide member 22 of the embodiment.

Specifically, although the guide member 40 of the second modification example is formed into a substantially plate shape by sheet metal forming or the like, the guide member 40 may be formed from ingot made of aluminum or the like. The guide member is disposed in the space between the front pillar 12 and the charging inlet 20 and has an inclined surface 40C that is inclined outward in the vehicle width direction from the vehicle front side toward the vehicle rear side, in a plan view.

The length of the inclined surface 40C of the guide member 40 in the second modification example is shorter than that of the inclined surface 22C of the guide member 22 in the embodiment. Specifically, one end 40A of the guide member 40 is bent along the pillar outer panel 16, and overlapped with and joined to the edge line 16C on the front side of the pillar outer panel 16.

Another end 40B of the guide member 40 is bent along a front surface of the pillar outer panel 16 that faces in the vehicle front direction, and overlapped with and joined to the front surface of the pillar outer panel 16. Due to this configuration, the length of the inclined surface 40C is approximately a half of the length of the inclined surface 22C of the guide member 22 of the embodiment.

In addition, the charging inlet 20 of the second modification example is located outward of the charging inlet 20 of the embodiment in the vehicle width direction. This configuration allows the inclined surface 40C of the guide member 40 to face the charging inlet 20 in the vehicle front-rear direction even when the length of the inclined surface 40C is shorter.

Reduction in size of the guide member 40 as in the second modification example reduces the weight of the vehicle. In addition, as in the second modification example, even when the charging inlet 20 is located outward of the charging inlet 20 in the embodiment in the vehicle width direction, the charging inlet 20 that is moved rearward upon the frontal collision of the vehicle is movable outward in the vehicle width direction along the inclined surface 40C of the guide member 40.

Although the vehicle front structures 10 according to the embodiment and the modification examples have been described above, it is needless to say that the vehicle front structures 10 may be implemented in various aspects without departing from the scope of the disclosure.

What is claimed is:

1. A vehicle front structure comprising:
   a front pillar extending in a vehicle up-down direction in a vehicle front;
   a charging inlet that is disposed in front of the front pillar in a vehicle front-rear direction and to which an outlet cable is connectable from a lateral side of a vehicle; and
   a guide member mounted to the front pillar, disposed between the front pillar and the charging inlet, and having an inclined surface that is inclined outward in a vehicle width direction from a vehicle front side toward a vehicle rear side, in a plan view,
   wherein the charging inlet includes a main body having a cylindrical shape;
   the main body has a chamfered portion on at least part of a peripheral surface of the main body, the part of the peripheral surface facing the guide member;
   the chamfered portion is inclined in the same direction as the inclined surface is; and
   wherein an inclination angle of the chamfered portion is the same as an inclination angle of the inclined surface.

2. The vehicle front structure according to claim 1, wherein:
   the front pillar includes a pillar outer panel having a hat shape in cross-section with an inner side of the pillar outer panel open in the vehicle width direction; and
   one end of the guide member is joined to an edge line of the pillar outer panel.

3. The vehicle front structure according to claim 2, wherein part of the guide member is disposed to overlap the charging inlet as viewed in the vehicle width direction.

4. A vehicle front structure comprising:
   a front pillar extending in a vehicle up-down direction in a vehicle front;
   a charging inlet that is disposed in front of the front pillar in a vehicle front-rear direction and to which an outlet cable is connectable from a lateral side of a vehicle; and
   a guide member mounted to the front pillar, disposed between the front pillar and the charging inlet, and having an inclined surface that is inclined outward in a vehicle width direction from a vehicle front side toward a vehicle rear side, in a plan view,
   wherein the front pillar includes a pillar outer panel having a hat shape in cross-section with an inner side of the pillar outer panel open in the vehicle width direction;
   wherein one end of the guide member is joined to an edge line of the pillar outer panel; and wherein part of the guide member is disposed to overlap the charging inlet as viewed in the vehicle width direction.

* * * * *